(12) United States Patent
Lindbo et al.

(10) Patent No.: US 11,993,412 B2
(45) Date of Patent: May 28, 2024

(54) PARCEL SORTING SYSTEM, METHOD AND A CONTAINER THEREFOR

(71) Applicant: Ocado Innovation Limited, Hatfield (GB)

(72) Inventors: Lars Sverker Ture Lindbo, Hatfield (GB); Andrew John Ingram-Tedd, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 847 days.

(21) Appl. No.: 16/980,514

(22) PCT Filed: Mar. 15, 2019

(86) PCT No.: PCT/EP2019/056619
§ 371 (c)(1),
(2) Date: Sep. 14, 2020

(87) PCT Pub. No.: WO2019/175424
PCT Pub. Date: Sep. 19, 2019

(65) Prior Publication Data
US 2021/0016905 A1 Jan. 21, 2021

(30) Foreign Application Priority Data
Mar. 15, 2018 (GB) ..................... 1804198

(51) Int. Cl.
*B65B 5/10* (2006.01)
*B07C 3/00* (2006.01)
(Continued)

(52) U.S. Cl.
CPC .............. *B65B 5/101* (2013.01); *B07C 3/008* (2013.01); *B65B 7/02* (2013.01); *B65B 7/2842* (2013.01);
(Continued)

(58) Field of Classification Search
None
See application file for complete search history.

(56) References Cited

U.S. PATENT DOCUMENTS

| | | |
|---|---|---|
| 1,111,428 A | 9/1914 | Aronoff |
| 4,784,287 A | 11/1988 | Yamada et al. |

(Continued)

FOREIGN PATENT DOCUMENTS

| | | |
|---|---|---|
| CA | 2920361 A1 | 12/2014 |
| CN | 2069389 U | 1/1991 |

(Continued)

OTHER PUBLICATIONS

Office Action (Examination Report No. 3) dated Mar. 16, 2022, by the Australian Patent Office in corresponding Australian Patent Application No. 2019233720. (4 pages).

(Continued)

*Primary Examiner* — Kavel Singh
(74) *Attorney, Agent, or Firm* — BUCHANAN INGERSOLL & ROONEY PC (57) ABSTRACT

A parcel sorting system is disclosed having bags located within rigid containers to form nested containers. The bags are configured to enable the bag to conform to an inner surface area of the rigid container. The resultant nested container can provide more efficient packing of packages and parcels for transportation.

6 Claims, 10 Drawing Sheets

(51) Int. Cl.
  *B65B 7/02*   (2006.01)
  *B65B 7/28*   (2006.01)
  *B65B 43/54*  (2006.01)
  *B65B 51/04*  (2006.01)
  *B65D 21/02*  (2006.01)
  *B65D 25/16*  (2006.01)
  *B65G 1/04*   (2006.01)

(52) U.S. Cl.
  CPC ............ *B65B 43/54* (2013.01); *B65B 51/046* (2013.01); *B65D 21/0233* (2013.01); *B65D 25/16* (2013.01); *B65G 1/0464* (2013.01); *B65G 2201/0285* (2013.01)

(56) References Cited

U.S. PATENT DOCUMENTS

| | | | |
|---|---|---|---|
| 5,150,810 | A | 9/1992 | Loebbert |
| 5,598,943 | A * | 2/1997 | Markus .................... F25D 3/08 62/464 |
| 5,979,693 | A * | 11/1999 | Bane, III ........... B65D 81/3825 220/592.2 |
| 6,036,049 | A * | 3/2000 | Hwang ................ B65D 43/164 220/817 |
| 7,320,411 | B1 | 1/2008 | Shenosky et al. |
| 8,256,640 | B2 * | 9/2012 | Luburic .................. B65D 1/42 220/669 |
| 9,796,080 | B2 | 10/2017 | Lindbo et al. |
| 10,556,742 | B2 | 2/2020 | Lindbo et al. |
| 10,913,572 | B2 * | 2/2021 | Shaikh .................. B65D 25/14 |
| 11,021,297 | B2 * | 6/2021 | Lindbo ................. B65D 11/12 |
| 11,453,552 | B2 | 9/2022 | Lindbo et al. |
| 2004/0182866 | A1 | 9/2004 | Carrillo |
| 2005/0112327 | A1 | 5/2005 | Skaggs |
| 2009/0039078 | A1 | 2/2009 | Sanfilippo et al. |
| 2012/0008886 | A1 | 1/2012 | Congiusta |
| 2013/0277265 | A1 | 10/2013 | Varbanov |
| 2016/0129587 | A1 | 5/2016 | Lindbo et al. |
| 2018/0043528 | A1 | 2/2018 | Lindbo et al. |
| 2018/0194500 | A1 | 7/2018 | Doppler et al. |
| 2020/0223629 | A1 | 7/2020 | Lindbo et al. |

FOREIGN PATENT DOCUMENTS

| | | |
|---|---|---|
| CN | 2252781 Y | 4/1997 |
| CN | 201376697 Y | 1/2010 |
| CN | 201604875 U | 10/2010 |
| CN | 102066213 A | 5/2011 |
| CN | 105517923 A | 4/2016 |
| EP | 3030504 B1 | 2/2018 |
| JP | 2007-084089 A | 4/2007 |
| JP | 2010-142555 A | 7/2010 |
| KR | 20160020563 A | 2/2016 |
| TW | M307592 U | 3/2007 |
| WO | 2014203126 A1 | 12/2014 |
| WO | 2015019055 A1 | 2/2015 |
| WO | 2015/197696 A1 | 12/2015 |
| WO | 2016197176 A1 | 12/2016 |
| WO | 2017081281 A1 | 5/2017 |

OTHER PUBLICATIONS

Second Office Action dated May 7, 2022, by the Chinese Patent Office in corresponding Chinese Patent Application No. 201980032017.6, and an English Translation of the Office Action. (11 pages).

Office Action (Communication) dated May 12, 2022, by the European Patent Office in corresponding European Patent Application No. 19 712 165.0. (5 pages).

Office Action dated Nov. 1, 2022, by the Korean Patent Office in corresponding Korean Patent Application No. 10-2020-7029601, and an English Translation of the Office Action. (11 pages).

Office Action (The First Office Action) dated Aug. 31, 2021, by the State Intellectual Property Office of People's Republic of China in corresponding Chinese Patent Application No. 201980032017.6 and an English Translation of the Office Action. (25 pages).

International Search Report (PCT/ISA/210) and Written Opinion (PCT/ISA/237) dated Aug. 21, 2019, by the European Patent Office as the International Searching Authority for International Application No. PCT/EP2019/056619.

Office Action dated Aug. 9, 2022, by the Canadian Patent Office in corresponding Canadian Patent Application No. 3,097,221. (4 pages).

Equinox MHE, Aug. 21, 2014, "Bomb Bay Sorter for Sorting Parcels and Large Letters", youtube.com, [online], Available from https://www.youtube.com/watch?v=ZxP82f19GZ8, [Accessed Sep. 6, 2019].

Office Action (Examination Report 1) dated Apr. 22, 2021, by the Australian Patent Office in corresponding Australian Patent Application No. 2019233720. (4 pages).

Office Action dated Nov. 22, 2021, by the Canadian Patent Office in corresponding Canadian Patent Application No. 3,097,221. (4 pages).

Third Office Action dated Nov. 30, 2022, by the Chinese Patent Office in corresponding Chinese Patent Application No. 201980032017.6, and an English Translation of the Office Action. (9 pages).

Office Action (Notice of Allowance) dated Apr. 7, 2023, by the Korean Patent Office in corresponding Korean Patent Application No. 10-2020-7029601, and an English Translation of the Office Action. (3 pages).

Office Action dated Apr. 12, 2023, by the Canadian Patent Office in corresponding Canadian Patent Application No. 3,097,221. (6 pages).

* cited by examiner

PARCEL SORTING SYSTEM, METHOD AND A CONTAINER THEREFOR

The invention relates to a parcel sorting system and method and a container therefor. More specifically but not exclusively, the invention relates to a parcel sorting system in which packing density of parcels for transportation round a geographical location is maximized whilst retaining the ability to automate and mechanize the system.

In the delivery industry, countless packages for shipment and delivery are collected from large numbers of locations spread across large geographical areas, and are processed in sorting systems before being shipped to required destinations. In a conventional parcel sorting operation the objective is to get everything for a predetermined or next destination onto the right trailer. At that destination, all individual parcels need to be sorted again for a further destination, which may be a local van depot or a collect location like a store.

Various forms of fully- and semi-automated sorting systems are known. Typical sorting systems, and the various components they comprise, take many forms. In some systems, packages travel along a conveyor which passes by a number of unloading stations each corresponding to a geographic destination. When a package on the conveyor passes the appropriate station, it is diverted by mechanisms such as stationary or pivoting barriers, tilt trays, or live roller beds into suitable transportation containers such as flexible bags or rigid boxes.

Transporting parcels and packages in rigid boxes has the advantage that a box can be more easily processed in mechanized or automated handling systems, which may include to and from temporary storage, however the density of packing achievable is not maximised. More flexible bags or parcel holders allow for a more dense packing regime in transportation vehicles but are not easily processed in automated or mechanized systems.

According to the invention there is provided a parcel sorting system comprising at least one collapsible flexible parcel holder and at least one container, the or each parcel holder comprising deployable elements, the or each parcel holder being locatable in a container, said deployable elements being arranged so as to ensure the external surfaces of the or each parcel holder substantially conforms to the internal surfaces of the container in which it is located, so as to create a combined, nested container, the nested container being adapted so as to receive parcels in such a manner that packing density of parcels within the nested container is maximized.

According to the invention there is further provided a method of maximizing the packing density of a flexible parcel holder comprising the steps of presenting the flexible parcel holder to a container; locating the flexible parcel holder in the container, and deploying elements within the flexible parcel holder such that the external surfaces of the flexible parcel holder conform to the internal surfaces of the container.

In this way, the present invention allows the sorting into many more smaller consignments (i.e bags, containers, boxes or any other suitable shipping containers) for a predetermined destination for example, "beyond next", and the sequencing of these consignments in the best order onto a vehicle. In this way the consignments, can be efficiently moved as a unit to said vehicle that will go to that further destination. Furthermore, the vehicle may make more than one stop, where the containers for first stop are easily accessible on the vehicle.

Preferably the sorting system comprises to a container system whereby flexible parcel holders such as bags are combined with more structurally rigid containers thereby maximizing packing density whilst retaining the ability to sort in automated sortation systems.

The invention also relates to a system and method of releasably nesting flexible parcel holders or bags in more structurally rigid containers whilst enabling the bag to conform to the internal surfaces of the container and take the shape of the container thereby enabling the bag to be retained in an 'open' arrangement within the container.

Moreover, the invention relates to a system and method for substantially sealing the bag once removed from the container whilst retaining a structural form enabling automated or manual handling of the bag in a manual or automated system.

In various aspects, the disclosure herein provides methods for fixing a flexible parcel holder or bag inside a container, so that the combined or nested entity can be used to collect packages at one or more locations and then be moved on to a destination where the flexible parcel holder, or bag, can be removed from the container so as to be loaded onto a vehicle in a space and weight efficient manner.

In one embodiment, the collapsible, flexible parcel holder is fixed to the container using a Hook-and-loop fastener such as Velcro™ where the "hook" part is attached to the container and the "loop" part to the bag or vice versa.

In another embodiment, also using hook-and-loop fasteners, both the container and the flexible, collapsible parcel holder have "hook" and "loop" parts in equal measure, each on two adjacent sides of the four sides of the container. This way the bag can be sealed by attaching the "hook" and "loop" parts once it has been removed from the container.

In another embodiment, at least the top of the flexible, collapsible parcel holder has permanent magnets for attachment to a magnetic surface of located at the top of the container. In order to remove the flexible parcel holder from the container an opposing magnetic force is applied and the parcel holder will be removable from the container.

Use of the deployable attaching means allows the flexible, collapsible parcel holder to conform to the inside surface of the container and hence take advantage of the more structurally rigid container whilst being easily removable from the container as required.

It will be apparent from the description below that in order to use the flexible collapsible parcel holder in the sorting system, it is necessary to seal the top of the parcel holder to prevent the parcels and packages therein not to fall out.

In one embodiment, the flexible parcel holder can be substantially sealed using a drawstring around the top or several drawstrings at different levels. Alternatively one or more cable ties may be used to substantially seal the bag or flexible parcel holder.

In a further form of this embodiment of the invention, the flexible parcel holder may be sealed using a removable lid portion. Preferably, the lid portion comprises further deployable structural means enabling the structure of the flexible parcel holder to be strengthened and stiffened for use outwith the container. Preferably, the lid portion comprises further hoop-and-look fastening means to attach the lid portion to the flexible parcel holder.

In a further form of this embodiment the "hook" or "loop" fastening means is attached to the bag so that it can easily be replaced, for instance using a Ziploc™ or a more adhesive hook-and-loop fastener.

In one embodiment the "hook" or "loop" part is attached to the container using a metal strip which can be, for example, slid into the plastic container.

In a further embodiment, the flexible, collapsible parcel holder has a number of handles, preferably designed for the easy manipulation of the parcel holder during placement and removal into and from the container. It will be appreciated that, these handles may also be used for handling the parcel holder for loading and unloading parcel holders in to suitable vehicles as well as opening the parcel holders at their destinations.

In one embodiment the containers are arranged into temporary storage using conveyors and crane systems.

In one embodiment the containers are arranged into temporary storage using a grid based system.

In this way, parcels may be sorted in containers and bags at the same time, to fully use the benefits of both methods.

The invention will now be described with reference to the accompanying drawings in which.

Figure 1:
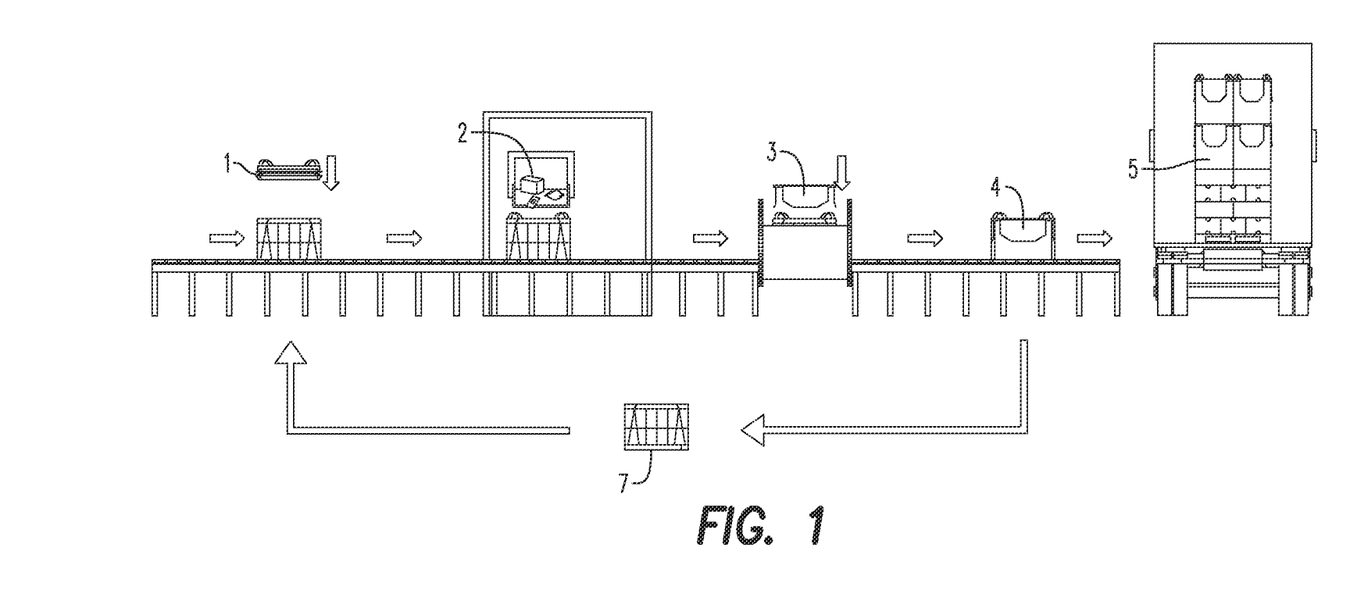
FIG. 1 shows a schematic, side view of one form of sorting system for parcels and packages in accordance with the invention, the system comprising a collapsible parcel holder locatable in a container formed from substantially rigid materials.

As shown in FIG. 1, the sorting system comprises a number of discrete parts, a presentation portion 1, a filling portion 2, a securing and sealing portion 3, a separating portion 4 and an onward transportation portion 5

Figure 2:
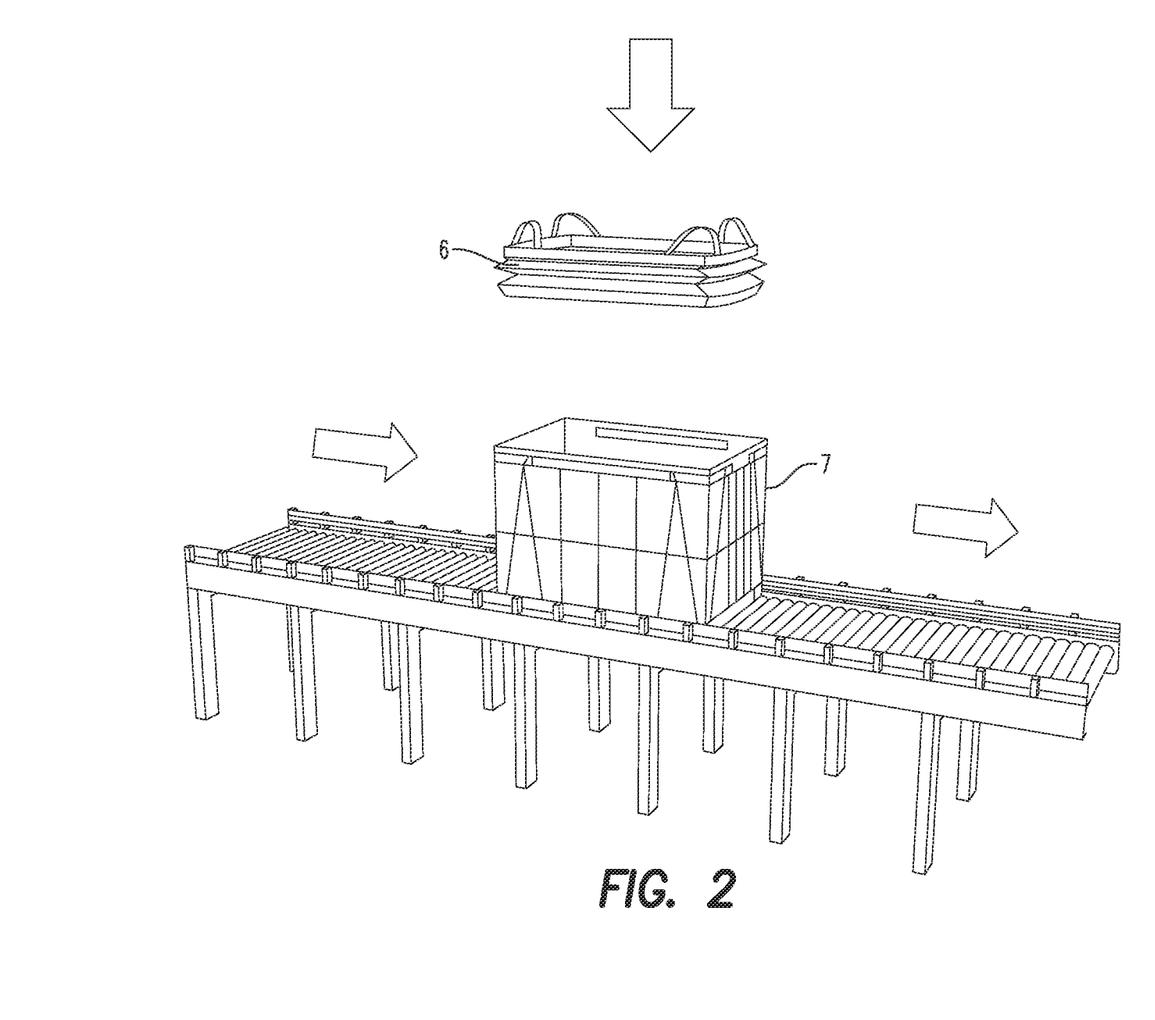
FIG. 2 shows a schematic, perspective view of one part of the sorting system of FIG. 1, showing in more detail the collapsible parcel holder being located in the rigid container to form a nested parcel handling device.

The presentation portion 1 comprises means for presenting a flexible, collapsible parcel holder 6 in to more structurally rigid container 7 so as to create a composite container 8. It will be appreciated that there are many ways of presenting a flexible bag and locating it in a more rigid container. However, in the present invention, once presented to the structurally rigid container 7, the flexible parcel holder or bag 6 is held in an open position within the container 7 by a deployable and releasable mechanism.

This mechanism may take the form of Velcro™ strips around the open circumference of the bag 6 or flexible parcel holder 6. It will be appreciated that the Velcro™ 'hook' strips around the top of the bag or flexible parcel holder 6 co-operate with opposing 'loop' strips fixedly attached to the top, open, inner surface of the rigid container 7.

The deployable mechanism may further take the form of collapsible semi-rigid and resilient strips fixedly attached to the top and edges of the flexible parcel holder or bag 6 such that when the flexible parcel holder or bag 6 is placed in the container 7, the strips deploy in a more rigid format such that the flexile parcel holder takes the form of the container 7. For example, shape memory materials may be used that can be activated between a flexible, collapsible form and a more structurally rigid form.

It will be appreciated that the flexible parcel holder will need to be maintained in an open position and as such a form of male retaining and engaging portion (not shown) may be provided in the structure of the container 7 that co-operates with a releasable female portion formed in the flexible parcel holder or bag. It will be appreciated that this is only one way in which the flexible collapsible parcel holder or bag may be retained in an open yet nested manner within the container 7. Any other form of releasably cooperating mechanism may be used.

In order to ensure that the flexible bag or parcel holder 6 is fully inserted in to the container 7, and taking the shape of the container 7, the presentation portion may comprise pushing or inserting means (not shown, but direction of movement indicated by the downward arrow in FIG. 2).

On exiting the presentation portion 1, the flexible parcel holder or bag 6 is fully located in the container 7 to form a nested entity 8.

Figure 3:
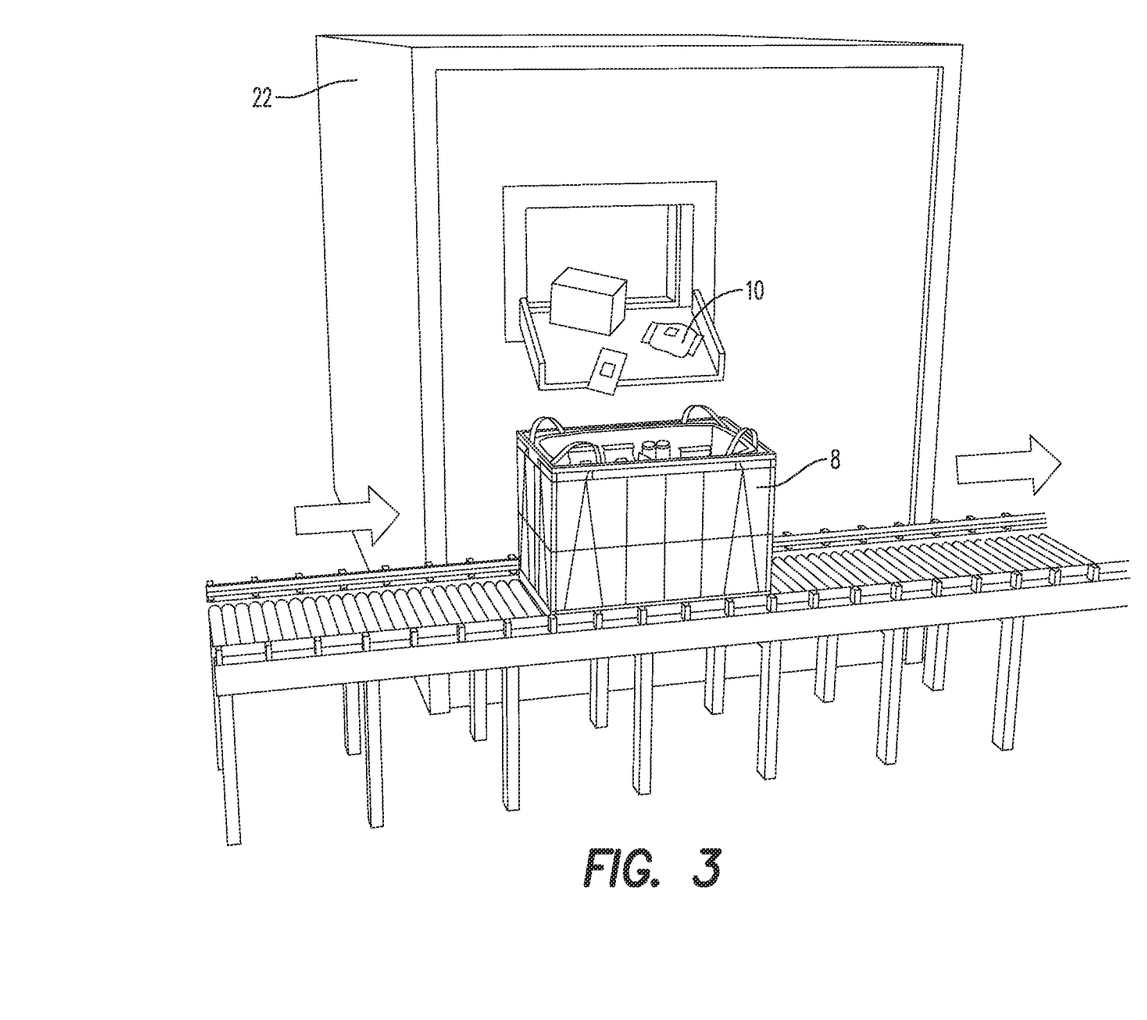
FIG. 3 shows a schematic, perspective view of a further part of the sorting system of FIG. 1, showing in more detail parcels and packages of varying shapes and sizes being automatically deposited in the nested parcel handling device.

The nested entity 8, hereinafter the nested container 8, is routed to the filling portion 3. At the filling portion 3, parcels, or packages, or shipment containers 10 and all other items suitably wrapped for onward transportation to a desired location are directed in to the nested container 8.

It will be appreciated that the parcels and packages 10 put in the nested container 8 may comprise items for transportation to the same destination, or for the same customer or for onward transportation to another part of the sorting and shipping system.

It will be further appreciated that the parcels and packages 10 put in to the nested container 8 may be manually placed therein or robotically placed therein or placed therein by any other suitable automated or manual process. Furthermore, the filling portion 2 may comprise part of a larger parcel sorting system such as that described in PCT Patent Publication Number WO2015/197696 (Ocado Innovation Limited) published on 30 Dec. 2015, the contents of which are hereby incorporated by reference.

Figure 10:
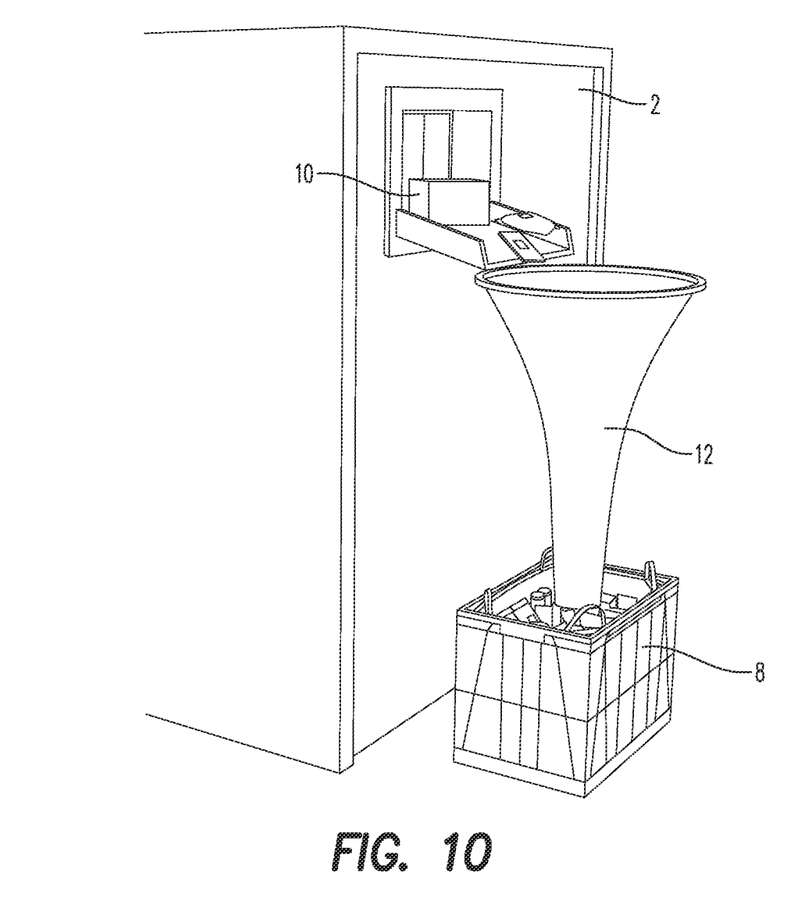
FIG. 10 shows an alternative form of the depositing part of the sorting system of FIG. 3 in accordance with the invention, showing in more detail parcels and packages of varying shapes and sizes being automatically deposited in the nested parcel handling device.

FIG. 10 shows an alternative form of filling portion 2 in which the parcels and packages 10 to be placed in to the nested container 8 are passed through a resilient chute, the resilient nature of the chute 12 acting so as to slow the descent of the parcels and packages in to the nested container 8 so as to prevent damage. It will be appreciated that this may allow parcels and packages to be dropped from greater heights or from different levels in the same building or warehouse system.

Once the nested container 8 is filled to a required or predetermined level, that may be defined by the density of packing of parcels within the flexible parcel holder 6, the filled nested container 8 is transported by suitable conveyance means to the sealing and securing portion 3.

The securing and sealing portion 3 comprises means for preventing the contents of the flexible parcel holder 6 from falling out once the holder 6 is removed from the container 7. Furthermore, the mechanism comprising the sealing and securing portion has the advantage of imparting some structural resilience to the flexible parcel holder 6 such that it may be stacked or stored in a space efficient manner even once removed from the container 7.

Figure 4:
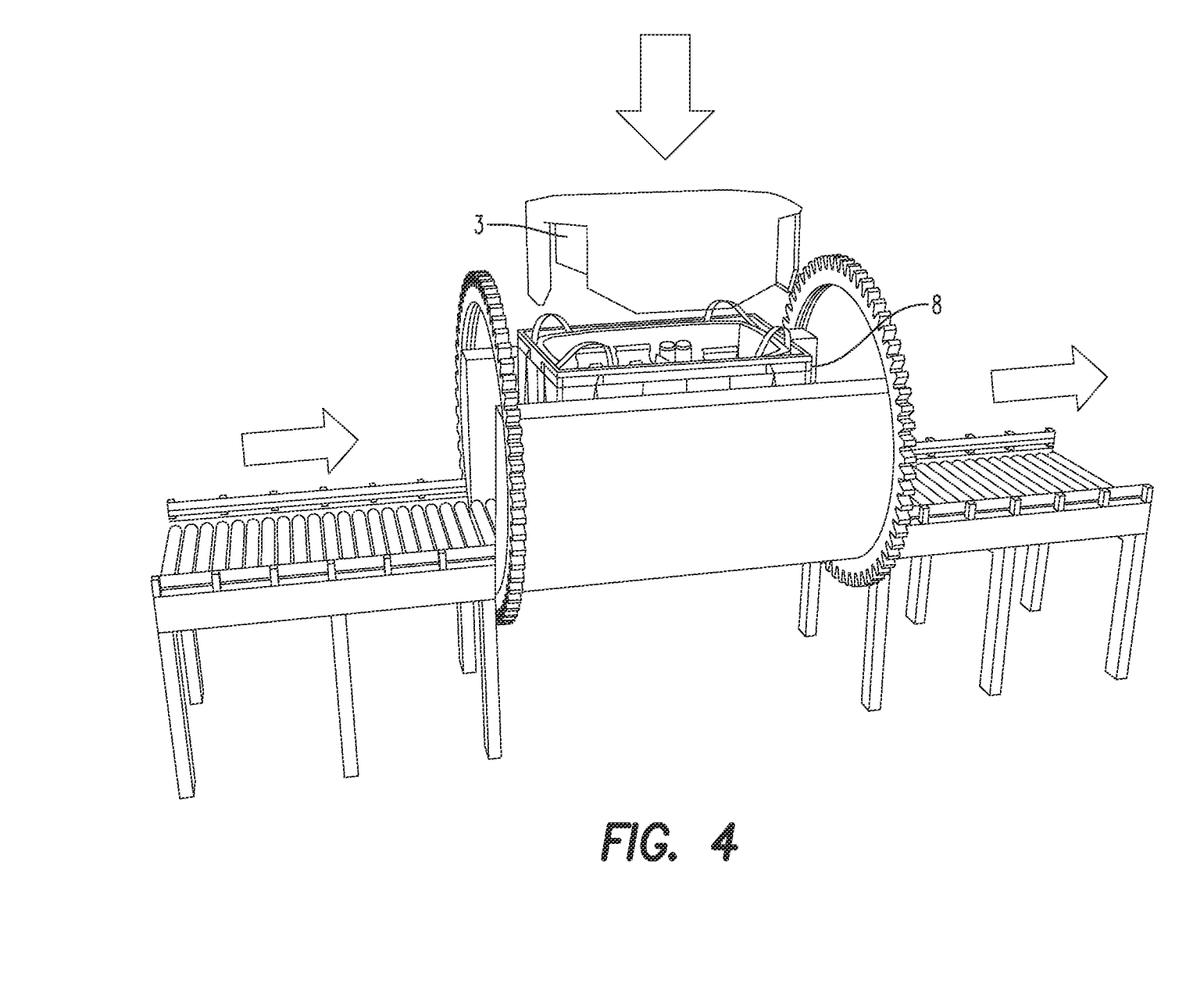
FIG. 4 shows a schematic, perspective view of a subsequent part of the sorting system of FIG. 1, showing a securing device in accordance with a further form of the invention, the securing device substantially securing the parcels and packages in the collapsible parcel holder to prevent parcels and packages from falling from the collapsible parcel holder whilst enabling the holder to be handled by further mechanical handling equipment.
Figures 5, 5A, 5B, 5C:
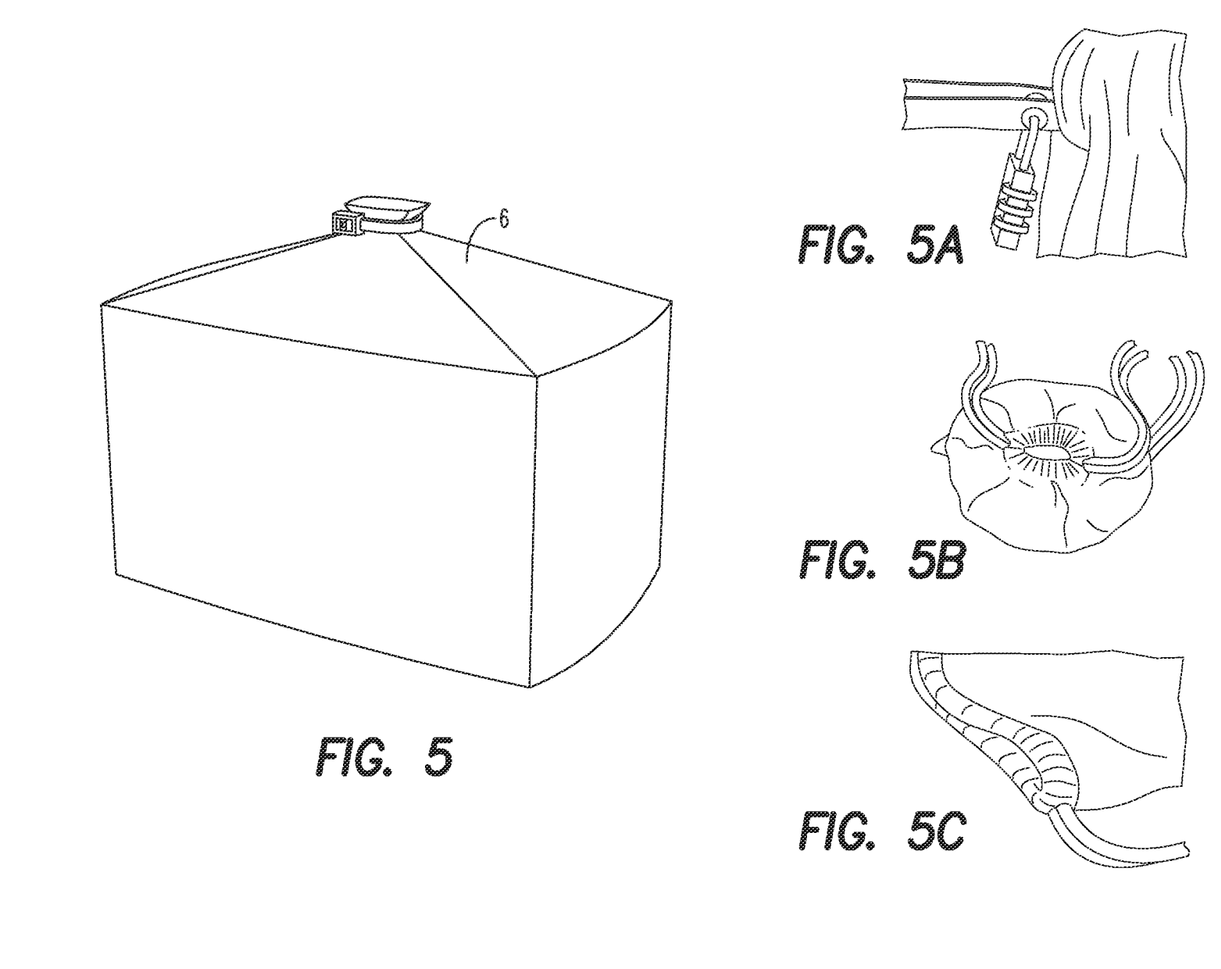
FIGS. 5, 5A, 5B, and 5C show a perspective view of an alternative form of sealing mechanism for the collapsible parcel holder.

One form of sealing and securing portion 3 is shown in FIG. 4. It will be appreciated that this is one form only of such a mechanism and any other mechanism may be used that acts so as to seal and secure the parcels and packages within the flexible parcel holder 6.

FIG. 4 shows a nested container 8 comprising packages and parcels entering the mechanism. The flexible parcel holder 6 comprising the parcels further comprises 4 handles located at the corners of the top of the parcel holder 6. The mechanism comprises means for grabbing said handles and releasing the flexible parcel holder 6 from the container 7. In the example shown in FIG. 4, the mechanism will lift the parcel holder 6 in an upward direction. Whilst the parcel holder 6 is being lifted out of the container 7, a sealing mechanism acts so as to place a lid portion on the flexible parcel holder 6. In the mechanism shown in FIG. 4, in order to assist in the sealing and securing of the flexible parcel holder or bag 6 within the container 7, the mechanism may rotate the arrangement so the weight of the parcels and packages within the bag 6 in the container 7 assists in the sealing and securing of the lid portion on the flexible parcel holder 6. It will be appreciated that the rotation of the arrangement only occurs once the lid portion is sufficiently in contact with the flexible parcel holder or bag 6.

FIGS. 5, 5A, 5B, and 5C show an alternative mechanism for sealing and securing the flexible parcel holder 6. In this form of the invention the flexible parcel holder or bag 6 comprises cable means that act in a drawstring manner so as to close the top of the parcel holder or bag 6. This may be achieved via any known method to a person skilled in the art. However, it may be achieved by locating a tie or cable in a seam in the circumference of the open flexible bag 6. A portion of the cable or tie may protrude from the seam such that it may be pulled by any suitable hook mechanism and act so as to close the top of the bag 6. It will further be appreciated that the handles of the flexible parcel sorter or bag 6 maybe used and drawn together and tied by cable tie means in an automated or manual system. It will be noted that in this mechanism additional space may be required at the top of the flexible parcel holder or bag 6 to allow for a drawstring effect.

Once the flexible parcel holder or bag 6 is sealed and secured by any suitable mechanism or method the nested container 8 is conveyed by suitable conveyance means to the separating portion 4.

The separating portion 4 comprises any suitable means of lifting the flexible parcel holder or bag 6 from the container 7. In the example shown in FIG. 6 a gantry crane is used to releasably attach to the handles of the flexible parcel holder 6 and separate the parcel holder 6 from the nested container 8.

Figure 6:
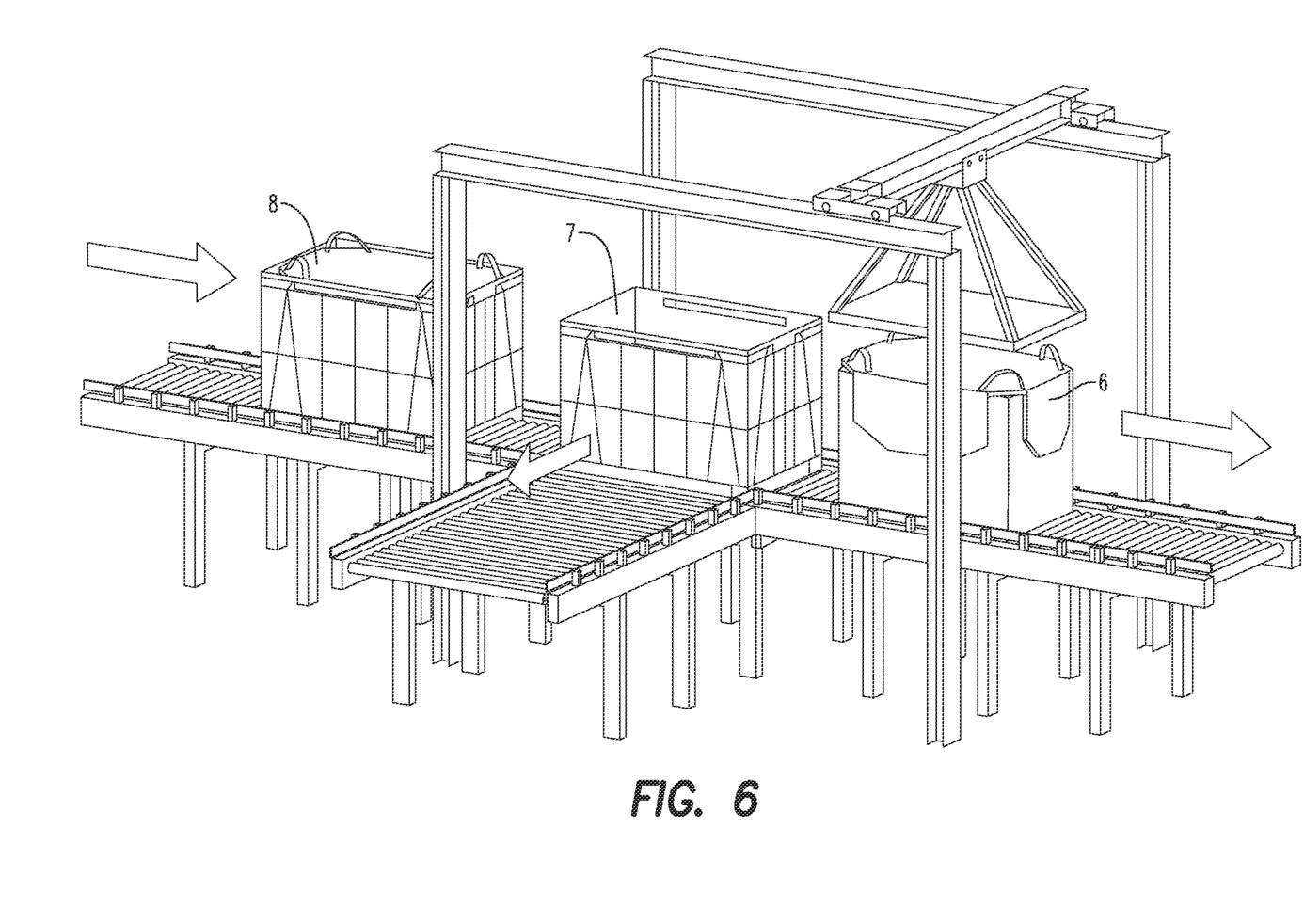
FIG. 6 shows a perspective view of one form of separating device for removing the collapsible parcel holder from the rigid container, the removed collapsible parcel holder comprising structural members enabling maximum packing density of parcels and packages within the parcel holder.

Once the parcel holder or bag 6 is removed the empty rigid container 7 can be returned to the presentation portion 1 and receive a further parcel holder 6 or bag for filling with parcels and packages as required.

Figure 7:
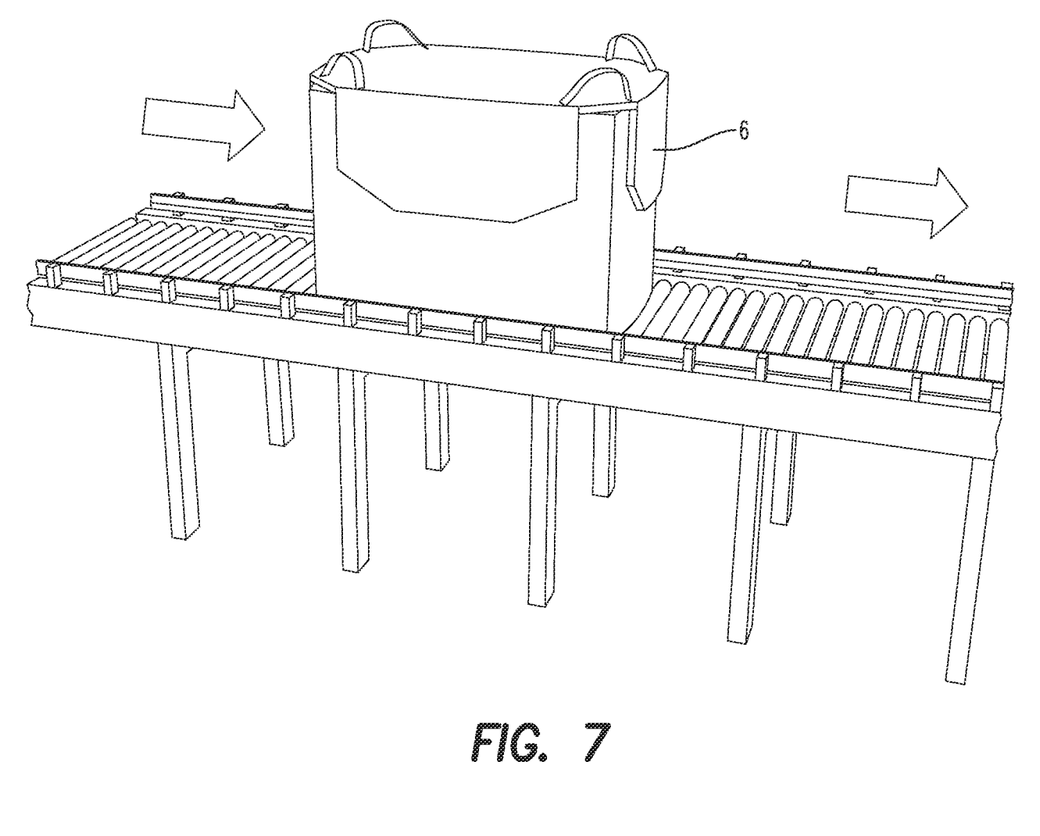
FIG. 7 shows a perspective view of the sealed parcel holder in accordance with one form of the invention being further transported through the parcel and package sorting system.

The separated semi rigid flexible parcel holder 6 may now be transported by any suitable conveyance means to the transportation portion 5 where a semi-rigid structure of the flexible parcel holder or bag 6 is achieved as the parcels and packages therein were located in the holder or bag 6 when supported by the container 7.

It will be appreciated that the lid portion provides further structural support to the parcel holder or bag 6. It will further be appreciated that the lid portion may comprise suitable fastening means for attaching the lid portion to the flexible parcel holder or bag 6. This may comprise hook and loop fastening as previously described above.

Figure 8:
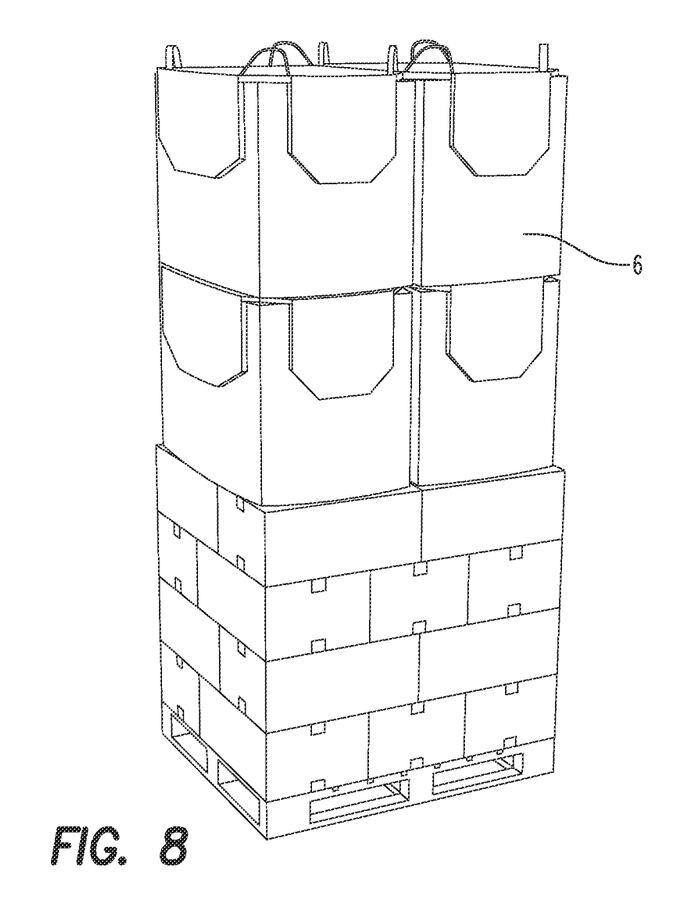
FIG. 8 shows a perspective view of a plurality of parcel holders together with a plurality of rigid shipping containers, the packing density of the parcel holders and rigid shipping containers being maximized.
Figure 9A:
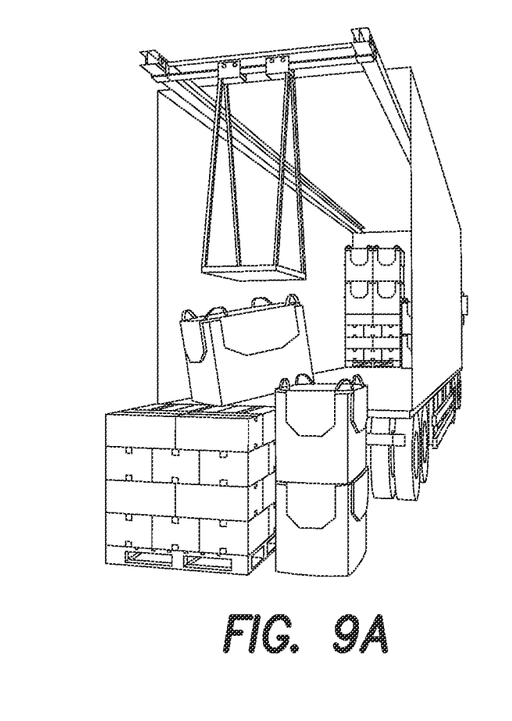
FIGS. 9A and 9B show the parcel holders and shipping containers being loaded in to suitable transportation vehicles, the parcel holders retaining structural integrity so as to enable maximum packing efficiency.
Figure 9B:
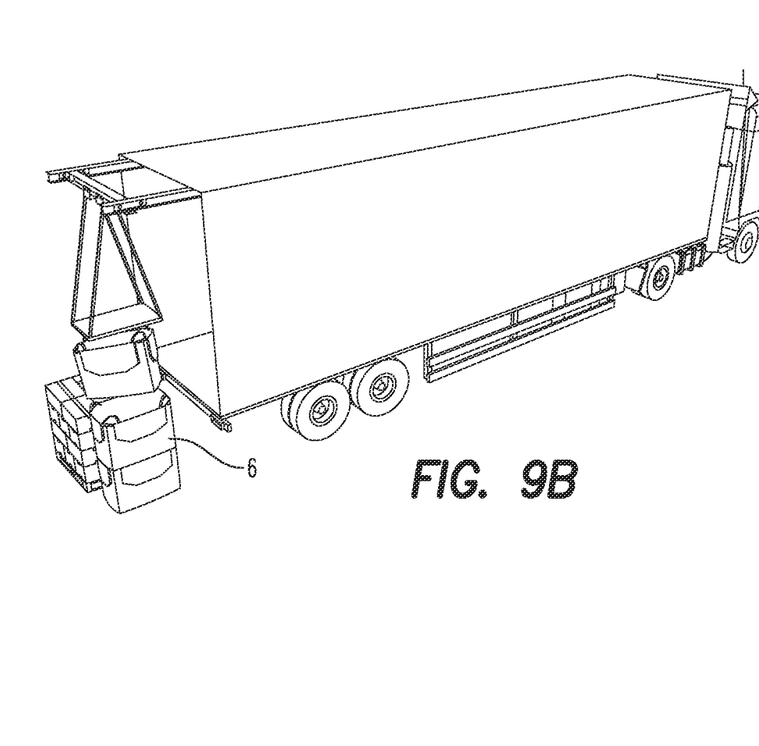

It will be further appreciated that once the removed parcel holder or bag 6 comprises a semi rigid form aided by the parcels and packages therein, it is possible to transport said holder or bag 6 as a separate entity. This may include stacking a plurality of said holders or bags 6 together or in association with other packages and containers such as depicted in FIG. 8. Furthermore, as shown in FIGS. 9A and 9B, said stacks of mixed containers and bags 6 or bags 6 only may be moved via crane or other winching device and located in a suitable transporting vehicle. It will be appreciated that the stacked nature of the semi rigid bags 6 and other containers assists in achieving improved packing density of containers and bags in said vehicle.

In one form of the invention, when the nested container 8 comprises parcels and packages, it may be conveyed by suitable conveyance means to a temporary storage portion of the sorting system. This may be required if adequate fill of the nested container 8 has not yet been achieved, in which case the flexible parcel holder or bag 6 may be in an open format or if there is a delay before a fully filled nested container 8 can be shipped via appropriate means, in which case the flexible parcel holder or bag 6 may be sealed and secured.

In either case, the location of the flexible parcel holder or bag 6 in a rigid container 7 allows for known storage systems to be used for temporary storage of the nested containers 8.

Such temporary storage systems may comprise grid-based systems such as those disclosed in EP(UK) 3030504 published as WO2015/019055A1 on 12 Feb. 2015, the content of which is hereby incorporated by reference.

It is an advantage of the parcel sorting system described above that the rigid structural containers 7 may form the containers described in the publication described above.

In all of the embodiments described above, the nested container 8 or the rigid container 7 or the semi-rigid flexible parcel holder or bag 6 may be conveyed between portions of the system or temporary locations by any suitable conveyance means. Indeed rigid containers 7 or nested containers 8 may be conveyed via robotic load handling devices as described in WO2015/019055 as incorporated by reference. However, it will be appreciated that this need not be the case and any suitable form of conveyor such as roller conveyor, powered or otherwise, may be used.

Whilst the description above relates to a system for shipping packages and parcels it will be appreciated that it may form part of a general merchandise system or any other retail system requiring goods to be shipped in parcels to discrete geographical locations. This may include but not be limited to online retail systems.

It will further be appreciated that the various portions described above may be as shown in the appended Figures or any suitable mechanisms capable of fulfilling the functions described may be used.

The invention claimed is:

1. A parcel sorting system, comprising:
   at least one collapsible flexible parcel holder and at least one rigid container, the at least one collapsible flexible parcel holder including deployable elements, the at least one collapsible flexible parcel holder being locatable in a rigid container, said deployable elements being arranged so as to ensure external surfaces of the at least one collapsible flexible parcel holder substantially conforms to internal surfaces of the rigid container in which it is located, so as to create a combined, nested container, the nested container being configured and adapted so as to receive parcels in such a manner that packing density of parcels within the nested container is maximized,
   wherein the nested container includes a removable lid portion attached to the at least one collapsible flexible parcel holder, the removable lid portion having a fastening means which is configured to couple to a fastening means of the at least one collapsible flexible parcel holder and a structural means which increases the stiffness of the at least one collapsible flexible parcel holder wherein the removable lid portion seals the at least one collapsible flexible parcel holder such that the contents of the at least one collapsible flexible parcel holder may be retained within the at least one collapsible flexible parcel holder, and
   wherein the sealed at least one collapsible flexible parcel holder may be removed from the rigid container after one or more parcels have been received within the at least one collapsible flexible parcel holder and the removable lid portion has been attached to the at least one collapsible flexible parcel holder.

2. A parcel sorting system according to claim 1, in which each nested container comprises:
   parcels and packages for onward transportation to a discrete geographical location.

3. A parcel sorting system according to claim 1, wherein the rigid container includes a fixing means which can engage with the deployable elements of the at least one collapsible flexible parcel holder so as to engage confirmation of the outer surfaces of the at least one collapsible flexible parcel holder with the inner surfaces of the rigid container.

4. A parcel sorting system according to claim 1, comprising:
   a presentation portion arranged so as to present the at least one collapsible flexible parcel holders to rigid containers to create separable nested containers;
   a filling portion arranged so as to feed parcels and packages in to said nested containers;
   a sealing and securing portion arranged so as to substantially seal and secure said parcels and packages within the flexible parcel holder within the nested containers; and
   a separating portion arranged so as to remove said sealed and secured flexible parcel holders from said containers.

5. A parcel sorting system according to claim 1 comprising:
   a grid-based storage system arranged so as to store at least one of said rigid containers and nested containers in stacks within a framework, the framework having a series of tracks or rails mounted thereon forming a grid pattern above the stacks of containers, the containers occupying a footprint of one grid space of the tracks or rails, the tracks or rails having operable thereon at least one robotic load handling device arranged so as to lift and retain one container and transport said container to a predetermined output port of the storage system.

6. A nested container configured and adapted for use in combination with the parcel sorting system of claim 1, the nested container comprising:
   a rigid outer container;
   an inner flexible container, the inner container comprising deployable fixing means so as to enable conformation of the outer surfaces of the inner flexible container with the inner surfaces of the outer rigid container, and
   a removable lid portion for attaching to the inner collapsible flexible container, the removable lid including:
   a fastening means which is configured to couple to a fastening means of the inner flexible container; and
   a structural means which increases the stiffness of the inner flexible container,
   wherein the removable lid seals the inner flexible container such that the contents of the inner flexible container may be retained within the inner flexible container.

\* \* \* \* \*